United States Patent [19]

Van Emden et al.

[11] Patent Number: 4,860,592
[45] Date of Patent: Aug. 29, 1989

[54] SOAP FILM GAS FLOW MEASURING DEVICE

[75] Inventors: Bernard Van Emden, Florham Park; Roman Stobnicki, Haldon, both of N.J.

[73] Assignee: Gilian Instrument Corp., Wayne, N.J.

[21] Appl. No.: 133,614

[22] Filed: Dec. 16, 1987

[51] Int. Cl.⁴ .............................................. G01F 1/708
[52] U.S. Cl. ................................ 73/861.05; 73/861.08
[58] Field of Search ........................... 73/861.05, 861.08

[56] References Cited

U.S. PATENT DOCUMENTS

| | | | |
|---|---|---|---|
| 1,616,481 | 2/1927 | Allen | 73/861.05 |
| 3,248,941 | 5/1966 | McArthur | 73/861.05 |
| 3,399,566 | 9/1968 | Brown | 73/861.05 |
| 3,820,392 | 6/1974 | Becit et al. | 73/861.08 |
| 4,691,577 | 9/1987 | Lalin et al. | 73/861.08 |

Primary Examiner—Herbert Goldstein

[57] ABSTRACT

A soap film gas flow measuring device for computing the rate of gas flow through the device by detecting each moment in time when a soap film crosses two positions in a flow tube through which the soap film is propelled by the gas flow, computing the time difference and calculating the flow rate. A set of insulated wire conductors is inserted through the flow tube at each position at which the soap film is to be detected and circuit means is used to detect a predetermined drop in conductivity between each set of conductors corresponding to the crossover point.

4 Claims, 4 Drawing Sheets

FIG. 2
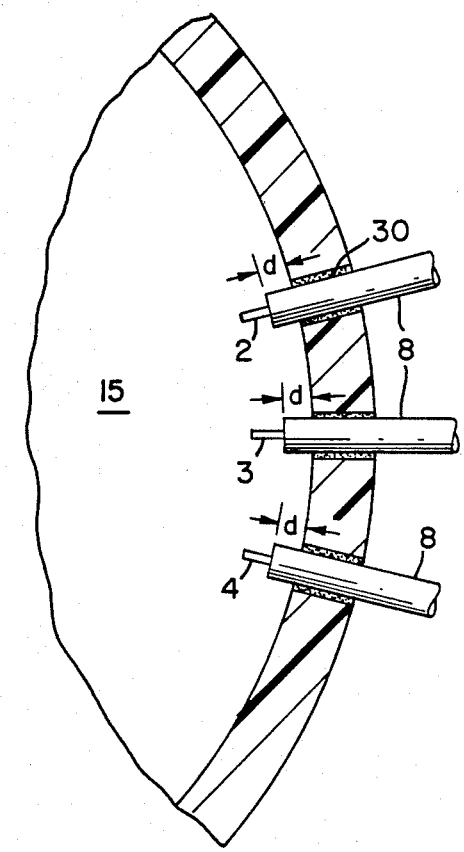
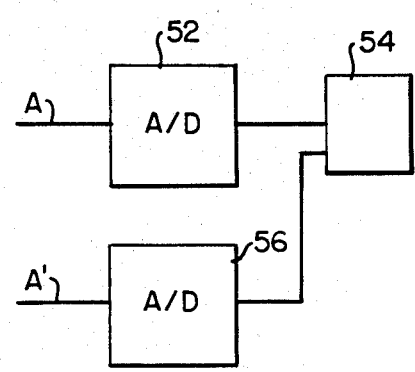
FIG. 7

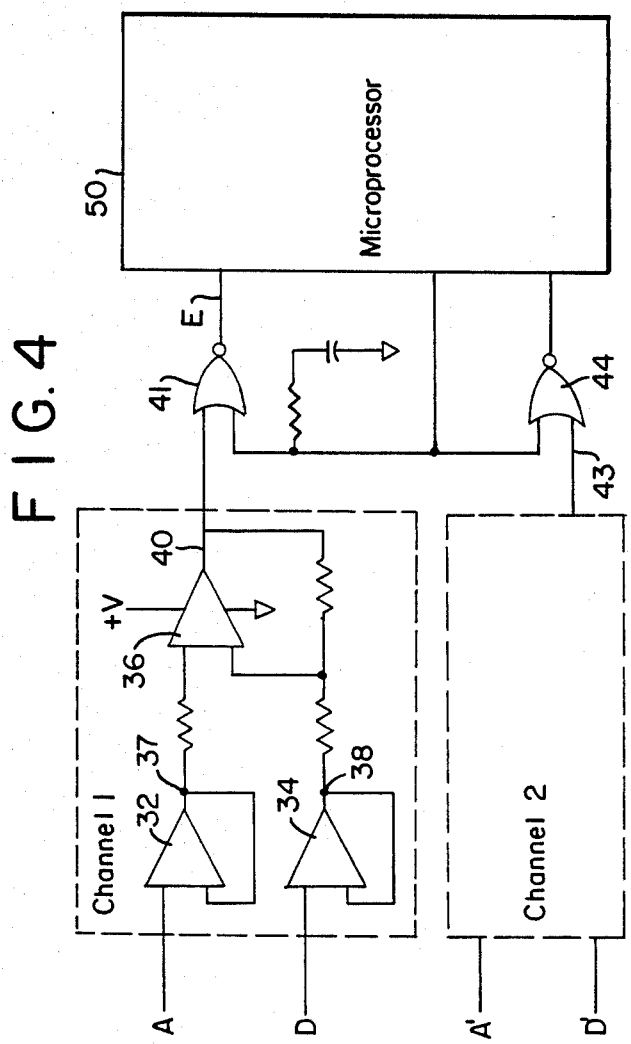

SOAP FILM GAS FLOW MEASURING DEVICE

BACKGROUND OF THE INVENTION

1. Field of the Invention

This invention relates to gas flow measuring devices which operate on the principle of measuring the time displacement of a soap bubble between two points on a flow tube. The displacement in time is converted to a measurement of flow.

2. Description of Prior Art

It is customary to sample the atmosphere of a work place or hostile environment to detect for the presence of a specific constituent or toxic contaminant and to measure its concentration. This is done by drawing a known volume of air through an air sampling system containing one or more filters or sorbent tubes which may be directly or subsequently analyzed to quantify the level of the constituent or contaminant in the air sample. The accuracy in calculating the concentration of any specific constituent in the air sample depends upon the accuracy in the measurement of the rate of air flow through the air sampling equipment.

One method for measuring air flow is to time the displacement of a film of soap solution between two points in a flow tube. At present, the position of the film of soap is optically detected using "LED" photodetectors as sensing elements. Two sets of photodetectors are required with each set aligned on opposite sides of the flow tube. The two sets are spaced a predetermined distance apart to define a measured distance. When the film of soap crosses a beam of light transmitted between the first set of photodetectors, the light beam is interrupted and a timing operation is initiated. The timing operation is terminated when the soap film crosses the light beam transmitted between the second set of photodetectors. Flow measurement is then calculated from a measurement of the transit time of the soap film between the two sets of photodetectors. This calculation can readily be accomplished automatically and displayed visually.

The accuracy of the flow measurement using an optical method of detection is dependent upon how accurately the photodetectors are aligned. The alignment of each set of photodetectors is a relatively complex and time consuming operation which adds considerably to the cost of manufacture of the flowmeter. In addition, since the flowmeter is designed for portable use, the additional power required by the photodetectors not only adds to the overall power requirement for the flowmeter, but represents a considerable power drain. Conversely, a flowmeter which does not require photodetectors to detect the soap bubble can be made smaller in size and more efficient in the use of power. This is particularly significant for portable operation.

OBJECTS OF THE INVENTION

The principal object of the present invention is to provide a soap film gas flowmeter in which the position of the soap film at selected points along the flow tube is detected electronically with minimal power requirement and high reliability.

It is a further object of the present invention to provide a relatively inexpensive soap film gas flowmeter having means for electronically detecting the presence of the soap film along the flow tube which is easy to install and requires very little electrical power.

SUMMARY OF THE INVENTION

The soap film gas flow measuring device of the present invention comprises: a flow tube having a hollow body with an open bottom and top end through which a soap film is propelled; a first closed chamber housing a soap solution, with the open bottom end of the flow tube mounted in the first chamber; a second closed chamber into which the open top end of the flow tube extends; gas inlet means extending into the first chamber for introducing gas at a flow rate to be measured; gas exit means extending into the second chamber for discharging the gas; means for introducing a soap film at the bottom end of the flow tube and means for electronically detecting the presence of said soap film at two or more selected locations along the flow tube wherein said electronic means comprises a first set of electrical conductors extending a predetermined distance through the hollow body of said flow tube at a first position along the flow tube, a second set of electrical conductors extending a predetermined distance through the hollow body of said flow tube at a second position along the flow tube separated a predetermined distance from the first position, circuit means for detecting a predetermined drop in conductivity between said first set of conductors corresponding to when said soap film reaches said first position; circuit means for detecting a predetermined drop in conductivity between said second set of conductors corresponding to when said soap film reaches said second position; and means for computing the transit time between each detected drop in conductivity.

BRIEF DESCRIPTION OF THE DRAWINGS

Other features, objects and advantages of the present invention will become apparent from the following detailed description of the invention when read in conjunction with the accompanying drawings of which:

FIG. 2 is a plane view of the flow tube of FIG. 1 taken along the lines 2—2 of FIG. 1 illustrating the preferred arrangement of the lower set of electrical conductors;

FIG. 4 is the preferred circuit, shown partly in schematic and partly in block diagram, for generating signal information from each set of conductors in the flowmeter of FIG. 1 from which air flow though the flowmeter is computer;

FIG. 7 is a circuit for processing the two wire embodiment.

DETAILED DESCRIPTION OF THE INVENTION

Figure 1:
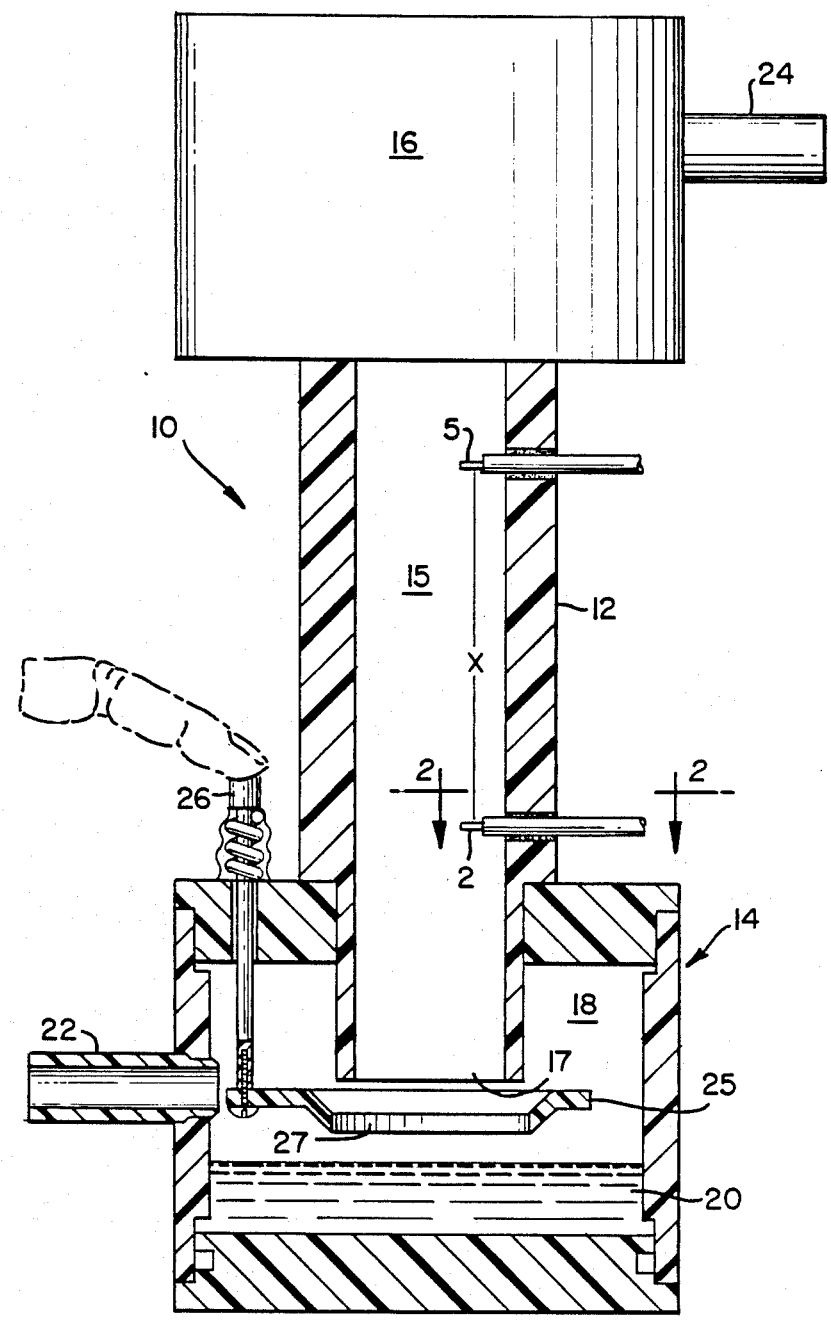
FIG. 1 is a view partially in vertical section and partially in elevation of the preferred embodiment of the flowmeter of the present invention.

The soap film gas flow measuring device of the present invention is identified by the reference numeral "10"

and, as is more particularly shown in FIG. 1, comprises a hollow flow tube (12) of substantially cylindrical configuration extending between a lower assembly (14) and an upper assembly (16). The flow tube (12) has a bottom open end (17) which projects into a chamber (18) in the lower assembly (14) above a soap solution (20). An inlet conduit (22) extends into the chamber (18) of the lower assembly (14). The inlet conduit (22) is connected to an air or gas supply (not shown) for introducing air or gas into the chamber (18) at a flow rate to be measured by the flow measuring device (10) of the present invention. The air introduced into the chamber (18) flows through the flow tube (12) from the open bottom end (17) thereof and passes into the upper assembly (16) from whence the air exits through the outlet conduit (24) in the upper assembly (16). The flow tube (12) has an open top end (not shown) which extends into a closed chamber in the upper assembly (16) for discharging air through the outlet conduit (24). The construction of the upper and lower assembly of the flow measuring device (10) corresponds to the construction of the upper and lower assembly in the soap film gas flowmeter described in U.S. Ser. No. 837,847, the disclosure of which is herein incorporated by reference.

A soap bubble is generated and transferred to the flow tube (12) as a soap film by the operation of a hoop (25) which is depressed into the soap solution (20) upon actuation of a push button (26). The hoop (25) has an opening (27) which is preferably circular and of a diameter preferably larger than the diameter of the flow tube (12). By depressing the push button (26) which is spring-loaded, the hoop (25) is caused to move along a substantially vertical path in which it is first lowered into the soap solution (20). Lifting the hoop (25) from the soap solution (20) generates a film of soap in the hoop opening (27). Upon raising the hoop (25) to the open bottom end (17) of the flow rube (12), the soap film is transferred to the flow tube (12). The air flow through the inlet conduit (22) causes the soap film to rise through the flow tube (12).

The lower set of electrical wire conductors (2), (3) and (4), as shown in FIG. 2, are arranged substantially in a common plane located above the lower assembly (14). A complementary second set of three wire conductors, with only conductor shown in FIG. 1, are arranged in a plane separated a fixed distance ("X") above the first set of wire conductors (2), (3) and (4). The distance "X" is a premeasured distance. The wire conductors in each set may be positioned relatively close together or wide apart.

Each wire conductor in each set of conductors is surrounded by an insulator (8) which functions to insulate each conductor and to prevent a false indication of a short circuit between conductors. The insulators (8) are inserted through openings (30) formed in the flow tube (12) and sealed in place using any conventional means such as a cement. It has been found essential to the present invention that each of the wire conductors in each set of conductors and each insulator (8) extends at least a minimum distance ("d") into the hollow body (15) of the flow tube (12). The wire conductors must also stick out from the insulators (8). The minimum distance ("d") has been found necessary to prevent the meniscus of the soap film and any soap residue on the flow tube wall from shorting out the conductors of either set. Although the minimum distance ("d") will vary for different diameter flow tubes, a minimum stick out distance of at least $\frac{1}{8}$ inch is required and preferably $\frac{1}{4}$ inch.

Figure 3:
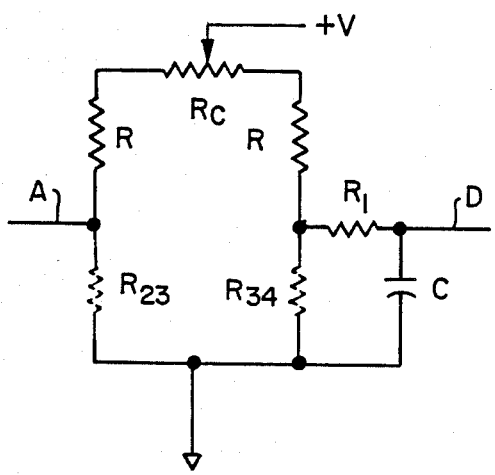
FIG. 3 is a schematic circuit diagram of a preferred bridge-type circuit arrangement for measuring the conductivity between the set of conductors illustrated in FIG. 2.

Each set of wire conductors is arranged in a wheatstone bridge-type circuit as shown in FIG. 3. For the set of wire conductors (2, 3, and 4) shown in FIG. 2, resistor (R23) represents the resistance between wire conductor (2) and wire conductor (3) and resistor (R34) represents the resistance between wire conductor (3) and wire conductor (4). Wire conductor (3) is connected to ground potential. Resistor (R23) is connected through a resistor (R) to a common resistor (Rc). Likewise, resistor (R34) is connected through an equivalent resistor (R) to the common resistor (Rc). The resistor (Rc) is connected to a source of voltage (V). An integrating circuit consisting of a resistor (R1) in combination with a capacitor (C) is connected across resistor (R34).

The circuit of FIG. 3 is connected at points A and D to the circuit of FIG. 4. Point A represents the output across conductor (2) relative to conductor (3) and point D represents the integrated output across conductor (4) relative to conductor (3). The output signals at points A and D for the lower set of wire conductors (2), (3) and (4) are supplied to a circuit represented in FIG. 4 as channel 1. Likewise, the corresponding outputs (A' and D') for the complementary upper set of wire conductors including wire 5 is fed to channel 2. Channel 1 includes operational amplifiers (32) and (34) and a comparator (36). The signals at points A and D of FIG. 3 are fed as input signals to the operational amplifiers (32) and (34). The output signals (37) and (38) of the operational amplifier (32) and (34) are connected as inputs to comparator (36). The output (40) of the comparator (36) is connected to a NOR gate (41). The circuit of channel 2 is identical to that of channel 1 with the output signal (43) connected to NOR gate (44). The outputs of NOR gate (41) and (44) are connected to a conventional microprocessor (50) for computing the time differential between the signals generated from the NOR gates (41) and (44) and for computing the rate of air flow through the flow tube (12) based upon the calculated transit time of the soap film between the two sets of wire conductors for a given flow tube diameter.

Figure 5:
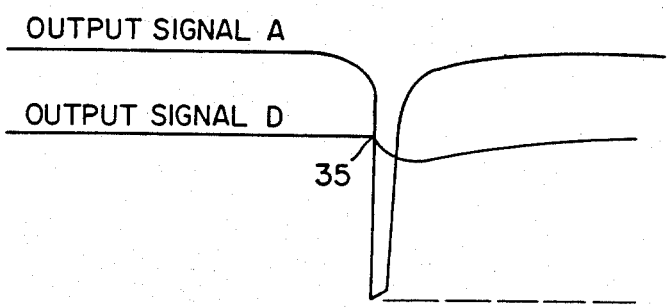
FIG. 5 is a trace of the output waveforms at designated locations in the circuit of FIG. 4 at the moment when a soap film bridges one set of electrical conductors in FIG. 1.

When the soap film crosses the lower set of wire conductors (2, 3 and 4), the conductivity between the wire conductors drops sharply. This sharp drop in conductivity is evident from the output waveforms in FIG. 5.

The integrating circuit of resistor (R1) and capacitor (C) in FIG. 3 does not allow a sharp excursion to occur at its output (D) when the conductivity of resistor (R34) sharply drops. This assures an accurate crossover point (35) in the comparator (36) and operates as a reliable indicator of the presence of the soap film. If the output across resistor (R34) were not integrated in forming output signal D, it would vary in a direct relationship with the output signal A. This would produce an unreliable and possibly inaccurate crossover point (35), since the output at point A and across resistor (R34) tends to drift and have amplitudes proportional to the distance between conductors (2) and (3) and conductors (4) and (3), respectively.

Figure 6:
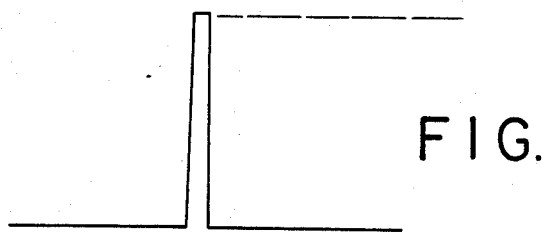
FIG. 6 is a trace of the waveform generated at the output of channel 1 in FIG. 4 corresponding to the moment when the FIG. 5 waveforms are generated.

The differential between the integrated output at point D and the output at point A is used to generate a pulse, as shown in FIG. 6 representing the output (40) of channel 1 which corresponds in time to when the soap film reaches the lower set of wire conductors (2, 3 and 4). A similar pulse is generated at the output (43) of channel 2 when the soap film reaches the upper set of wire conductors including conductor 5. The microprocessor (50) is programmed to measure the time differential of the soap film between the two sets of wire conductors and to compute the flow rate therefrom.

An alternative embodiment for the three (3) wire conductor arrangement shown in FIGS. 2 and 3 would be a two (2) conductor arrangement. In such case, one of the conductors of each set of three wires would be eliminated. Assuming in FIG. 2, wire (4) was not present, the arrangement would exemplify the two (2) conductor arrangement. Likewise, in FIG. 3, the output (A) would represent the voltage across resistor (R23), i.e., the voltage across conductor (2) relative to conductor (3). The leg containing resistor (R34) and the integrating circuit would be eliminated. The output (A) would be fed to an analog to digital converter (52), as shown in FIG. 7, with its output fed to a microprocessor (54) corresponding to the microprocessor (50). A corresponding output (A') for channel 2 would likewise be fed to the microprocessor (54) through another analog to digital converter (56). A predetermined change in digital output to the microprocessor would represent the presence of the film of soap.

What we claim is:

1. A soap film gas flow measuring device comprising a flow tube having a hollow body with an open bottom and top end, respectively; a first closed chamber housing a soap solution, with the open bottom end of the flow tube mounted in the first chamber; a second closed chamber into which the open top end of the flow tube extends; gas inlet means extending into the first chamber for introducing gas at a flow rate to be measured by said flow measuring device; gas exit means extending into the second chamber for discharging the gas; means for generating a soap film from said soap solution and transferring it to the bottom end of the flow tube and means for electronically detecting the presence of said soap film as it passes two selected locations along the flow tube wherein said electronic means comprises a first set of at least three electrically insulated wire conductors extending a predetermined minimum stick out distance through the hollow body of said flow tube at a first position above the flow tube with each wire electrode protruding from its insulator, a second set of at least three electrically insulated wire conductors extending a predetermined minimum stick out distance through the hollow body of said flow tube at a second position above the flow tube, with each wire electrode protruding from its insulator and with said second set of electrodes spaced a predetermined distance from the first position; circuit means for detecting a predetermined drop in conductivity between said first set of conductors corresponding to when said soap film crosses said first set of conductors and circuit means for detecting a predetermined drop in conductivity between said second set of conductors corresponding to when said soap film crosses said second set of conductors.

2. A soap film gas flow measuring device as defined in claim 1 wherein said minimum stick-out distance is ¼ inch.

3. A soap film gas flow measuring device as defined in claim 1 wherein each set of wire conductors is connected in a bridge-like circuit arrangement with the center wire conductors connected to ground potential.

4. A soap film gas flow measuring device as claimed in claim 3 further comprising a microprocessor for measuring the time differential between signals corresponding to when the soap film crosses each set of wire conductors.

* * * * *